United States Patent [19]

Kneer

[11] 4,161,426

[45] Jul. 17, 1979

[54] APPARATUS FOR REMOVING GASEOUS IMPURITIES

[75] Inventor: Franz X. Kneer, Hanau-Mittelbuchen, Fed. Rep. of Germany

[73] Assignee: Gebruder Weiss KG, Frohnhausen, Fed. Rep. of Germany

[21] Appl. No.: 751,945

[22] Filed: Dec. 17, 1976

[30] Foreign Application Priority Data

Dec. 23, 1975 [DE] Fed. Rep. of Germany ....... 2558256

[51] Int. Cl.² .................... C12B 1/00; C12B 1/16
[52] U.S. Cl. ..................... 435/313; 55/74; 55/387; 55/479; 248/128
[58] Field of Search ............. 195/2, 127, 136, 137, 195/142, 144, 109; 55/74, 99, 387, 479; 248/128

[56] References Cited

U.S. PATENT DOCUMENTS

| 2,200,581 | 5/1940 | Pruss et al. | 195/142 X |
| 2,750,328 | 6/1956 | Stimpson et al. | 195/142 |

Primary Examiner—Lionel M. Shapiro
Attorney, Agent, or Firm—Toren, McGeady and Stanger

[57] ABSTRACT

A method for removing gaseous organic impurities from waste gases comprising contacting the waste gas with an absorbent composed of a biologically active compost having a medium degree of maturity obtained by the aerobic digestion of settled sludge or organic waste which has been treated with *Actinomyces globisborus* or Coprinus fungi. An apparatus for carrying out the process is also disclosed.

5 Claims, 1 Drawing Figure

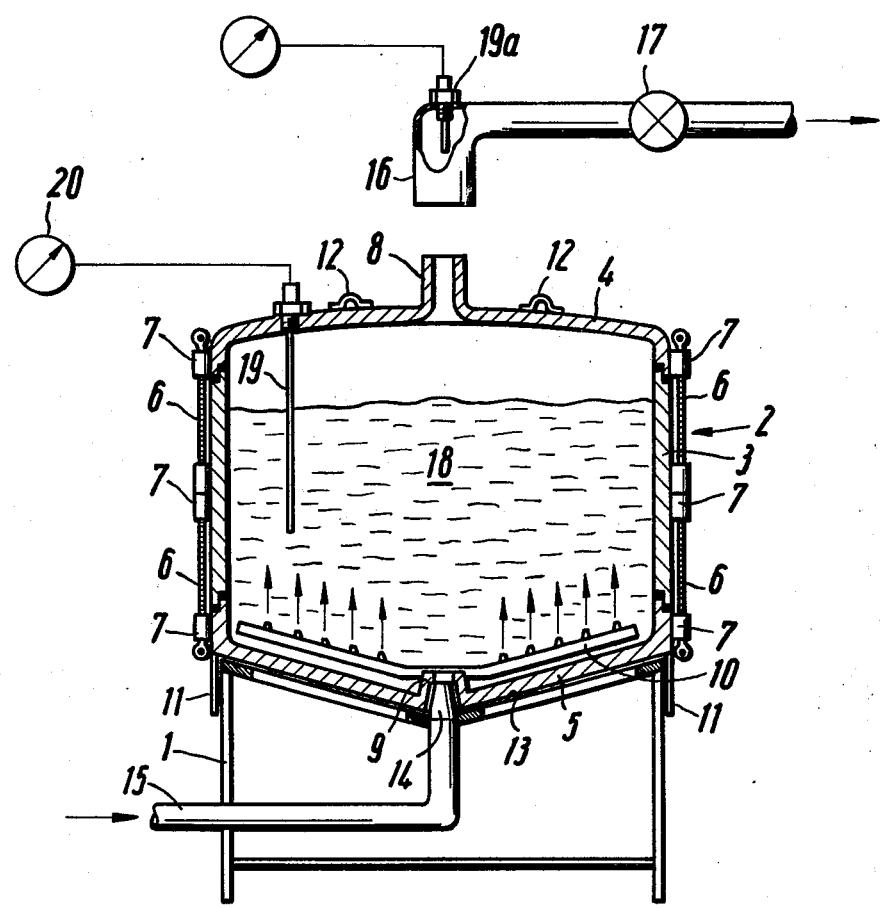

APPARATUS FOR REMOVING GASEOUS IMPURITIES

BACKGROUND OF THE INVENTION

1. Field of the Invention

The invention relates to a filter device for separating gaseous organic impurities from waste gases.

2. Background of the Prior Art

As used herein, the term gaseous organic impurities means all waste gases which originate from organic degradation processes, for example, from animal farms, from processing operations in animal carcass utilization plants, from fermentation and rotting or digestion processes, as well as from industrial plants.

It is well known that gaseous impurities may be separated from waste gases by using filters which consist of a drum-shaped, rotating separating unit which rotates about an axis and contains filter material, e.g., low-temperature coke from peat, brown coal, bituminous coal or wood charcoal, such as those described in the German Offenlegungsschrift 1,619,861. Of course, whenever the adsorption capacity is exhausted, a new charge has to be introduced into the separating unit.

By these processes, gaseous impurities, especially in the form of sulfur dioxide, can be removed by adsorption from waste gases since sulfuric acid is formed in the presence of oxygen and water vapor, and the sulfuric acid must be released in a processing step that follows the absorption.

Experience has shown that the organic impurities mentioned hereinabove can only be incompletely separated and converted with such devices. The impurities and extraneous materials that occur, cannot all be adsorbed and the porous surface of such absorbents, and of filters that may be positioned before the absorbents are quickly blocked by suspended matter in the waste gases.

BRIEF DESCRIPTION OF THE DRAWING

The drawing is a cross-sectional view of an apparatus in accordance with the present invention.

SUMMARY OF THE INVENTION

It has been discovered that the filtration of organic compounds from waste gases can be significantly improved, if they are passed through an absorbent that moves, in the manner of a migrating layer, from top to bottom through a vessel, through which the waste gases flow. The absorbent for the process is an incompletely decomposed compost of organic waste, obtained by an aerobic digestion process and/or settled sludge. The spent filter material is continuously removed from the vessel and continuously replaced by fresh filter material.

Such a filter device therefore requires a digestion reactor and organic waste in sufficient amounts. However, these requirements cannot be fulfilled everywhere.

The object of the present invention is to create, using the exchange of filters, a filter device that is easy to operate, that produces, without a digestion reactor, a significantly improved filtration result in comparison with known filters and that is constructed in such a way, that the filter material can be exchanged readily.

The objects of the invention have been accomplished by a vessel which has a coupling flange, is connected to a stationary rack by means of quick-release couplings and which contains as an absorbent, a biologically highly active compost of a medium degree of maturity. This absorbent is obtained by an aerobic digestion process from organic waste and/or settled sludge and that contains about 30% to 35% water and about 55% to 70% organic material and is treated with microorganisms of the species. *Actinomyces globisborus, flavus* and *farinus,* and fungi of the Coprinus variety, the Aspergillus and Mucor species.

DESCRIPTION OF THE PREFERRED EMBODIMENT

According to a preferred embodiment of the invention, the vessel is in the form of a portable container and has an inlet in its base and an outlet in its lid. The inlet is connected to an inlet connecting piece attached to a supporting frame for the container. The inlet connecting piece fits into registration with the inlet of the container to form a gas-tight connection. This is further connected to a jet system within the vessel at its base and has an indicator for showing the biological effectiveness of the absorbent.

In the filter device of the invention, the actual filter accordingly is a container, which holds a biologically active humus as a filter material and which is connected, in such a way that it can readily be connected to and removed from a stationary device that has all the connections and and auxiliary units. As a result, the container having the fresh humus therein may be easily connected to the stationary device, utilized to process the gas, and when the activity of the humus has deteriorated to an insufficient level, the entire container can be easily disconnected and another container with fresh humus be substituted in its place.

The filter material is highly populated with microorganisms. As the organic, gaseous impurities, which are to be purified, are passed into the vessel, the microorganisms in the filter material receive nourishment once again and therefore become active once more. In this biologically active filter material, a vigorous reaction takes place, that is to say, further decomposition as well as biological degradation reactions proceed.

Sulfur dioxide compounds are filtered out by the filter, as generally is the case with the known filters. Also all of the remaining organic compounds, that occur in the waste gases, are converted or degraded and even heavy metal ions are immobilized, if suitable additives, such as, bentonite, are used.

The exhaust air leaving the filter device is absolutely free of any odors and has been purified to remove all injurious materials. This is due to the use of a filter material which is highly active biologically. Thus, in contrast to the known filter materials, continuous reactions take place in this material which contribute biologically to the rotting or digestion of the material and in which the odoriferous and injurious materials of the waste air or gas are included and thereby converted or degraded.

It has therefore turned out that this filter material can also be used to advantage in those situations where a filter material, consisting of dried humus — a so-called earth filter — has hitherto been used. It ought to be mentioned that, while the filter of the invention is being used, the filter material contained therein digests further and, after biological reactions can no longer be detected and the filter therefore has only limited usefulness, the filter material can also be used as a humus material, possibly after a post-composting.

After the filter material is spent, as shown bby suitable indicators, for example, by conductivity measurement, by biological activity measurements, by measurement of a certain gas in the waste air, etc., the container is lifted from the rack and a second container, which is already filled with fresh filter material is put in its place. The container, that has been lifted off, is emptied at a suitable site and filled with fresh filter material.

In order to maintain the effectiveness of the filter at a high level, it may be advantageous that a blower, that can also draw in fresh air be connected to a waste-air connecting piece on the rack in order to regulate the waste air flowing through the container and that this blower be connected by means of quick-release couplings with the corresponding connecting piece of the container.

This measure depends essentially on the amount and the rate of flow of the waste air. The correct rate of flow can be determined by simple experiments.

The capacity of such a container is selected to be between two and ten cubic meters, in order to hold the amount of filter material necessary for maintaining biological activity, while keeping the size of the container such that it can still be transported. Containers of this size can easily be brought to the site of the filter and lifted, by means of a crane mounted on a truck, onto or off the rack and transported from there to the place where they are to be filled.

Referring now to the drawing, a device for filtering waste gases is shown consisting of a stationary rack 1, on which is placed a vessel 2 in the form of a container or chamber, which is adapted to be lifted from the rack 1. The vessel 2 consists of a middle piece 3 in the form of a cylindrical jacket, which is connected with upper and lower lids 4 and 5, respectively, by means of tightening screws 6 and locks 7 so as to be gas-tight and detachable.

The upper lid 4 has an outlet 8 and the lower lid 5 an an inlet 8, as well as a system of jets 10 as means for distributing the gas. Also attached to lower lid 5 are supporting legs 11. By means of rings 12, the vessel can be lifted from the rack 1.

The rack has a seating means 13 for centering the vessel thereon. An inlet connecting piece is arranged centrally in this seating and is connected with a quick-release coupling, which is not shown, to pipe 15, which leads to the waste air which is to be purified.

When placed on the rack, inlet 9 of the vessel matches or is in registration with the inlet connecting piece 14 of the rack 1, so as to be form-fitting and gas-tight. The inlet 9 is in turn connected with the system of jets 10, which has already been mentioned and which is arranged in the base of the vessel. As indicated, a suction blower 17 can, if necessary, be connected via a waste-gas connecting piece 16 with the outlet 8.

The vessel 2 is filled with aggregate 18, which is used as filter material and which consists of a biologically highly active compost of a medium degree of maturity, which may be obtained by a process according to German Auslegeschrift 2,253,009. The degree of maturity and thereby the biological activity of the filter material is measured by a suitable probe. Typically, the means for measuring the biological activity may include a conductivity measurement, a biological activity measurement, measurement of a certain gas in the waste air, etc. The activity is shown on an indicating instrument 20. This instrument determines and can be adapted to continually check whether the filtering material still has the desired filtering properties. The probe may be mounted in the waste-air connecting piece 16 at 19a.

The compost, used as filter material, contains about 30-35% water and about 55-70% organic material, as well as microorganisms of the *Actinomuces globisborus, flavus* and *farinus* species and fungi of the Coprinus variety, the Aspergillus and Mucor species.

When the waste gas containing the organic impurities flows by way of the jet distribution system 10 through the filter material and is distributed over the area of the vessel, the organic compounds become involved in the biological reactions which cause the compost to rot, and thus they are completely converted or degraded. Even heavy-metal ions in the waste air are immobilized in the filter material, if bentonite is introduced as additive into the aggregate.

As soon as the filter material no longer has the desired properties, the pipe connections are loosened and the vessel is lifted off the rack, transported away and emptied at a central site and filled up again. Since the rotting has continued while the filter was in use, the spent filter material is a hygienically unobjectional humus material.

When the first vessel is taken off the rack, it is replaced by a second one, which is already filled with fresh filter material. This second vessel is then connected to the feed pipes.

Using the device, described in the invention, for filtering organic impurities from waste gases, it is possible, by a simple and economic procedure, to filter and completely free such waste gases which may originate, for example, from animal farms, from fermentation or rotting processes, from industrial plants and from odoriferous materials.

What is claimed is:

1. An apparatus for removing gaseous organic impurities from waste gases by contacting the waste gas with an absorbent, comprising a closed container having an inlet at its base and an outlet at its top; a supporting stand for receiving and holding said container, said stand having quick disconnect-means adapted for registration and gas-tight connection of said inlet on placement of the container on the stand with a source of waste gas and said container having means in the bottom thereof for distributing the waste gas entering the inlet over the entire area of the container and means for measuring the biological activity of absorbent in the container.

2. An apparatus for removing gaseous organic impurities from waste gases by contacting the waste gas with an absorbent, comprising a closed container having an inlet at its base and an outlet at its top; a supporting stand for receiving and holding said container, said stand having quick disconnect-means adapted for registration and gas-tight connection of said inlet on placement of the container on the stand with a source for distributing the waste gas entering the inlet over the entire area of the container and means for measuring the biological activity of absorbent in the container and wherein the container is composed of a central cylindrical piece and a top lid and a bottom lid, the central piece and top and bottom lids being connected by tightening screws, the upper lid having the outlet therein and the bottom lid having the inlet and the distribution means therein.

3. An apparatus for removing gaseous organic impurities from waste gases by contacting the waste gas with an absorbent, comprising a closed container having an inlet at its base and an outlet at its top and containing an absorbent composed of a biologically active compost having a medium degree of maturity, said compost being obtained by the aerobic digestion of organic waste or settled sludge, and which contains about 40 to 35% water and about 55 to 70% organic material, said waste material or sludge having been treated with microorganisms selected from the group consisting of *Actinomyces globisborus* or fungi selected from the group consisting of the Coprinus variety; a supporting stand for receiving and holding said container, said stand having quick disconnect-means adapted for registration and gas-tight connection of said inlet on placement of the container on the stand with a source for distributing the waste gas entering the inlet over the entire area of the container and means for measuring the biological activity of absorbent in the container.

4. The apparatus of claim 1 wherein the supporting stand further has means for regulating the flow of waste gas through the container said means comprising an exit tube adapted for quick-disconnect from the outlet of the container, having blower means therein, said tube having means for the introduction of fresh air thereinto.

5. The apparatus of claim 1 wherein the capacity of the container is at least about two cubic meters.

* * * * *